Patented Sept. 26, 1922.

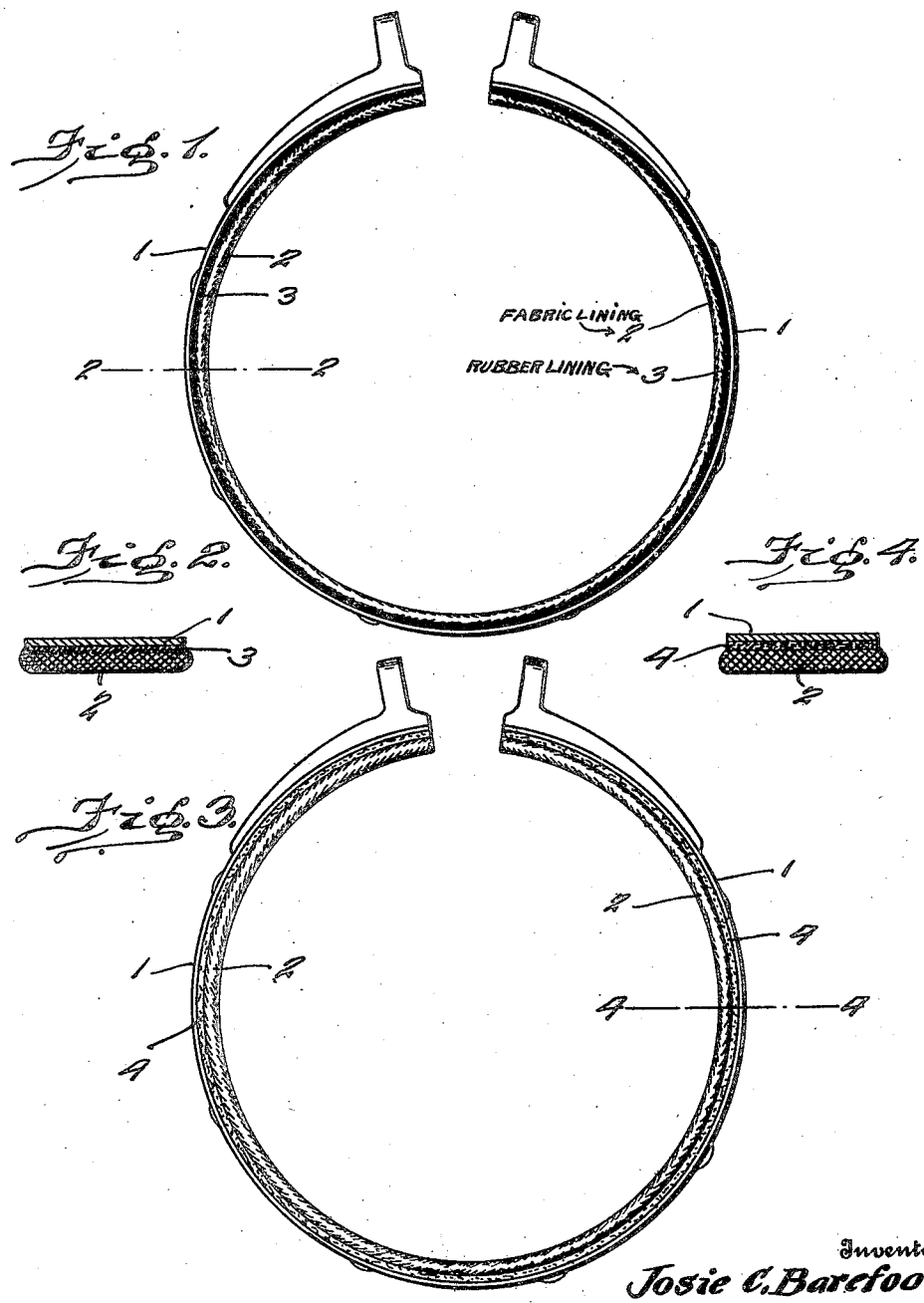

1,430,143

UNITED STATES PATENT OFFICE.

JOSIE C. BAREFOOT AND AARON A. KNEE, OF CHARLOTTE, NORTH CAROLINA, ASSIGNORS TO VELVET ACTION BRAKE LINING COMPANY, OF MECKLENBURG COUNTY, NORTH CAROLINA, A CORPORATION.

BRAKE-BAND LINING FOR AUTOMOBILES, ETC.

Application filed May 11, 1921. Serial No. 468,569.

*To all whom it may concern:*

Be it known that we, JOSIE C. BAREFOOT and AARON A. KNEE, citizens of the United States, residing at Charlotte, in the county of Mecklenburg and State of North Carolina, have invented new and useful Brake-Band Linings for Automobiles, Etc., of which the following is a specification.

The object of our invention is to provide a brake band lining having a novel resilient backing whereby a more gradual and efficient application of the brake will be obtained by reason of the resilience of the device.

In the accompanying drawings illustrating our invention—

Figure 1 is a side elevation of a brake band having a rubber vulcanized backing member;

Figure 2 is a section on line 2—2 of Fig. 1.

Fig. 3 is a side elevation of another form of the invention having a cork lining member; and Fig. 4 is a section on line 4—4 of Fig. 3.

Like numerals designate like parts in each of the several views.

Referring to the accompanying drawings, 1 designates the conventional metal brake band and 2 the side of the fabric lining of same. We provide a rubber lining 3, as shown in Fig. 1, said lining being vulcanized to the fabric band.

In the modified form of our invention, we provide a cork band 4 interposed between the fabric band 2 and the metal band 1.

In either of these forms the resilience of the rubber element or of the cork element 4 results in a certain degree of resilience in the application of the brake band which increases the efficiency of the brake.

Our brake band lining prevents chattering or grabbing of brakes. It also prevents screeching. It also prevents pounding of torsion arm and drive shaft and housing. It prolongs the life of tires by exerting an equilized and gradual grip on the brake bands when applied. In consequence of its effect in equalizing pressure of the brakes on the drums it tends to prevent skidding. It prolongs the life of the axle and drive shaft by preventing brake grabbing which would cause a jerking of the rear system of the automobile.

Our brake band lining can also be used to to line clutches on automobiles and it is our intention to apply same to clutches as well as brakes.

What we claim is—

1. In a brake band lining for automobiles, the combination with a metal brake band of a strip of resilient material extending uniformly around and affixed to the band throughout its length, and a fabric band vulcanized to the resilient band, whereby a degree of resilience in applying the brake band will be attained.

2. In a brake band lining for automobiles, the combination with a metal brake band, of a fabric band, a rubber lining member vulcanized to said fabric band and interposed between the fabric and metal bands, said rubber lining member being firmly attached to the metal band throughout its length, substantially as shown.

3. As a new article of manufacture, a brake band lining for attachment to a brake band or clutch element, said lining comprising a heavy fabric band member, and a resilient lining member of resilient substance, said resilient lining member being vulcanized to the inner surface of the fabric band element to which the lining is to be applied, and being of uniform thickness throughout.

JOSIE C. BAREFOOT.
AARON A. KNEE.